United States Patent

[11] 3,621,387

| | | |
|---|---|---|
| [72] | Inventors | Kent F. Smith;<br>Kay D. Smith, both of Salt Lake City, Utah |
| [21] | Appl. No. | 851,903 |
| [22] | Filed | Aug. 21, 1969 |
| [45] | Patented | Nov. 16, 1971 |
| [73] | Assignee | General Instrument Corporation<br>Newark, N.J. |

[54] COMPUTER-CONTROLLED TESTER FOR INTEGRATED CIRCUIT DEVICES
19 Claims, 7 Drawing Figs.

[52] U.S. Cl. .................................................. 324/73 R
[51] Int. Cl. ................................................ G01r 31/00
[50] Field of Search ........................................ 324/73

[56] References Cited
UNITED STATES PATENTS
3,219,927   11/1965   Topp, Jr. et al. ............... 324/73
OTHER REFERENCES
The Electronic Engineer, Aug., 1967, pp. 82–83

Primary Examiner—Alfred E. Smith
Attorney—James and Franklin

ABSTRACT: A test apparatus produces a simulated input signal for a device under test and a predicted output signal which that device would correctly product at its output in response to that simulated input. The device output signal and the predicted output signal are compared for logic content, and the amplitude of the device output signal is compared against predetermined reference levels. A separate error signal is produced upon the occurrence of an error in either of these properties in the device output signal.

The input and predicted output signals are initially stored into the apparatus from an external computer which also establishes the appropriate clock signals and power supply signals for the device under test. In the embodiment herein shown, the input and output data is preloaded in shift registers and means are provided to sequentially transfer the simulated input and predicted output signals in a time controlled manner from these shift registers to the device and to the output signal comparator.

COMPUTER-CONTROLLED TESTER FOR INTEGRATED CIRCUIT DEVICES

The present invention relates generally to electrical test equipment, and particularly to a test apparatus for testing the operation of signal-processing devices such as, but not limited to, integrated circuits fabricated by Large Scale Integration (LSI) techniques.

One of the most significant developments in recent years in the area of electrical circuit fabrication is that of Large Scale Integration (LSI) in which a great number of circuits, including a great number and variety of components, are fabricated on a single chip of semiconductor material. This technique has been facilitated by the subsequent development of Metal Oxide Silicon (MOS) and Metal Thick Oxide Silicon (MTOS) fabrication techniques.

These processes enable the system designer to package a great number of circuits in a relatively small volume. Those circuits have the significant advantages of operating at low levels of power dissipation and at high operating (e.g., switching) rates. As a result LSI circuits have thus found wide acceptance, for example, as logic and memory circuits in digital computer systems and the like. The reliability of such systems depends greatly on the reliability and accuracy of operation of the component circuits, and thus a need has arisen for new and sophisticated equipment and procedures for testing LSI circuits. Such testing is relatively difficult because of the great number of difficult functional sections in each circuit, and because of the many different operating parameters which must be checked. To completely evaluate the operation of a given circuit it must be subjected to both static and dynamic tests and measurements. These tests include leakage tests, power tests, and functional tests, the latter being particularly useful in the testing of logic circuits to determine whether or not the circuit being tested performs its desired logic operation upon an input signal. In a functional test, which may be either combinational or sequential, a known signal is applied to one or more of the circuit inputs, and the actual circuit output signal is checked to determine whether it conforms to the output signal that the circuit should correctly produce in response to the specified input signal.

In the performance of these tests, it is desirable that the circuit be operated at or near its normal operating conditions with respect to load, power supply, and in the case of a logic circuit, clock signals.

It is thus apparent that an apparatus for testing LSI circuits must be able to develop and analyze a large quantity of data and test signals. Moreover, to be practical, that test apparatus must be adaptable to perform tests on a large number of different LSI circuits having widely different logic transfer functions and operating parameters. Moreover, the test system should be operable over a wide range of signal frequencies which are commonly used in the operation of LSI circuits. For a test apparatus to be able to satisfy the requirements for use with the vast number of LSI circuits presently and potentially available, it must be able to perform hundreds of different tests, where each test may contain as many as thousands of bits of information.

In the past an individual testing device had to be specially designed and fabricated for each circuit that was to be tested. This is clearly an expensive and time-consuming procedure and is useful only when there are only a relatively few circuit types to be tested. There is a clear need for the provision of a test apparatus that can be adapted and utilized to perform tests and measurements on the great number of different integrated circuits in present and anticipated commercial use.

To increase the flexibility of the known testers to enable them to perform tests on more than one type of integrated circuit, it has been proposed that a digital computer be programmed and employed to provide at least some of the input test signals to the circuit, as well as to assist in the analysis of the test results. In these computer-aided testers, the computer remains operatively tied into the test circuit during the performance of the test and is used as a source of test data. The maximum frequency of data signals which can be reliably provided from the computer is generally limited in the range of 10 kHz. for softwave generated signals. As present MOS-LSI circuits are capable of operating at frequencies of as high as 2 MHz., the known computer-aided testers are only usable to test a limited number of circuits, and to perform only a limited number of tests on these circuits. This limitation is primarily a result of the operating limitations of the computer itself. These known computer-aided testers are also limited in the number of information bits that they are capable of supplying to the circuit being tested, which further limits their usefulness.

In summary, while the use of computers in the testing of integrated circuits increases the flexibility and adaptability of the testers by permitting their use with different types of circuits, their inherent limitations as to frequency and information content limit their applicability and thus their usefulness as integrated circuit testers.

It is an object of the present invention to provide a circuit tester which may be used in the testing of a great number of different circuits.

It is a further object of the present invention to provide a tester which is capable of performing a variety of different tests and measurements on a given circuit.

It is another object of the present invention to provide a computer-controlled tester which is capable of providing data signals to a circuit under test at greater frequencies than has heretofore been possible.

It is another object of the present invention to provide a computer-controlled tester which is capable of providing data signals to a circuit under test at greater frequencies than has heretofore been possible.

It is yet another object of the present invention to provide a computer-controlled circuit tester in which the computer need not be retained in the test circuit during the performance of a test.

It is still another object of the present invention to provide a tester capable of performing a functional test on a logic device, which provides separate indications of the occurrence of a logic error and/or an error in the amplitude of the output signal.

It is yet a further object of the present invention to provide an integrated circuit device tester which may be readily adapted to test most, if not all, commercially available MOS integrated circuits, which is reliable and relatively simple to operate, and which is relatively inexpensive and compact in size.

To these ends, the circuit tester of the present invention has the capability of producing a simulated input signal for the device under test, as well as a predicted output signal corresponding to that output signal which the circuit under test would correctly produce at its output when the simulated input signal is applied to the device input. Means are provided to compare the predicted output signal with the actual output signal from the device under test and to prepare a test signal indicating the results of that comparison. In addition, the propagation delay between the input signals and the device outputs may be examined to determine whether it is within specified limits.

The simulated input signal and the predicted output signal are initially (i.e., prior to the test) supplied to data storing means from an external computer source. During a test that computer is removed from the storing means and means are provided to transfer the previously stored input and predicted output data in a controlled manner to the circuit under test and comparing means respectively. Since the computer at the time of testing is no longer in the test system, the rate at which data signals are applied to the circuit under test is independent of the computer capabilities and thus may be significantly higher than the maximum data transferring rate of the computer.

In the embodiment of the test apparatus herein disclosed, the simulated input and predicted output words are initially stored in shift registers, a single such register being provided for each input and each output, from which registers individual bits of these words are serially transferred at a rate corresponding to the frequency of a common system oscillator or clock. Timing signals, also corresponding to the clock frequency, are applied to the input and output data shift registers to effect the transfer of the input and output data words to the device and to the comparator at the proper times.

The timing signals are produced by a series of additional shift registers into which data is initially (i.e., prior to a test) loaded from the computer in a predetermined pattern, which patterns in turn, determine the time and phase relationship between the timing signals. Still other shift registers, also preset from the external computer, produce simulated clock signals for the device under test to control its operation. The computer may preset power supply voltages and currents for the device as well as the DC load operatively connected to the output of the device during the performance of a test, or these parameters may be manually preset.

The comparator circuit of the present invention has the capability of simultaneously checking both the amplitude of the actual output signal of the device against reference levels preset either manually or by computer and the logic content of the circuit output signal against the predicted output signal. If the amplitude test indicates an error, an amplitude error signal is produced, and if the actual output signal and the predicted output signal are logically not alike, a logic error signal, distinct from the amplitude error signal, is produced. The presence of either or both of these error signals indicates a malfunction in the circuit under test. To the accomplishment of the above, and to such other objects as may hereinafter appear, the present invention relates to the design and operation of a computer-controlled circuit test apparatus as defined in the appended claims and as described in this specification, taken together with the accompanying drawings, in which:

GENERAL DESCRIPTION

The test apparatus of the present invention has the capability of performing a variety of tests on an integrated circuit device (hereinafter called "device under test" or DUT) and to ascertain whether that device operates according to its design parameters. The tester is operated in conjunction with an external computer which is programmed to establish conditions for testing a particular device. In this manner a great variety of tests may be performed on a large number of types of device simply by varying the program of the external computer to in turn establish a new set of test conditions in the test apparatus. During the performance of a test the computer, having already established the test conditions for the tester, is removed from operative connection therewith.

The tester is capable of performing three basic tests on the device under test. These are: (1) functional tests, in which the logic of the operation of the device on an input signal is examined both for logic content and amplitude; (2) leakage tests; and (3) power tests. In each test, an appropriate indication is produced by the tester when any tested parameter of the DUT (e.g., leakage current) deviates from a preset nominal or acceptable level.

Functional Tests

Figure 1:
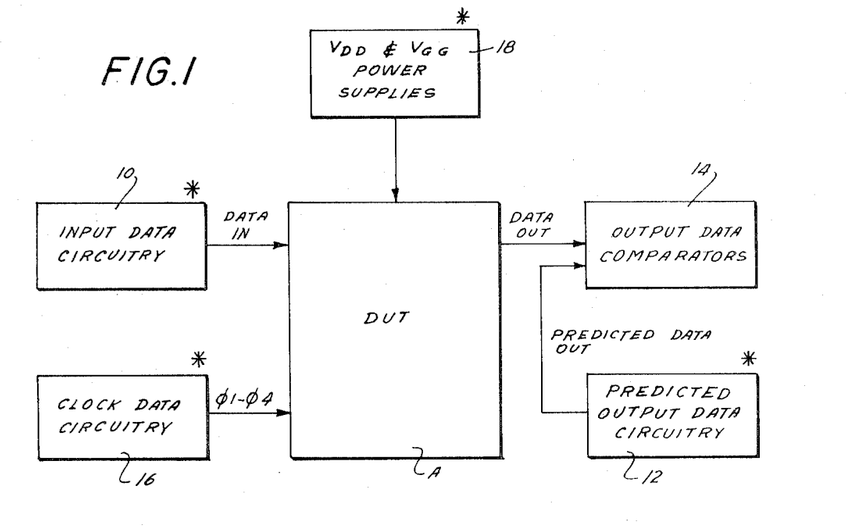
FIG. 1 is a functional block diagram of the test apparatus of the present invention.
Figure 2:
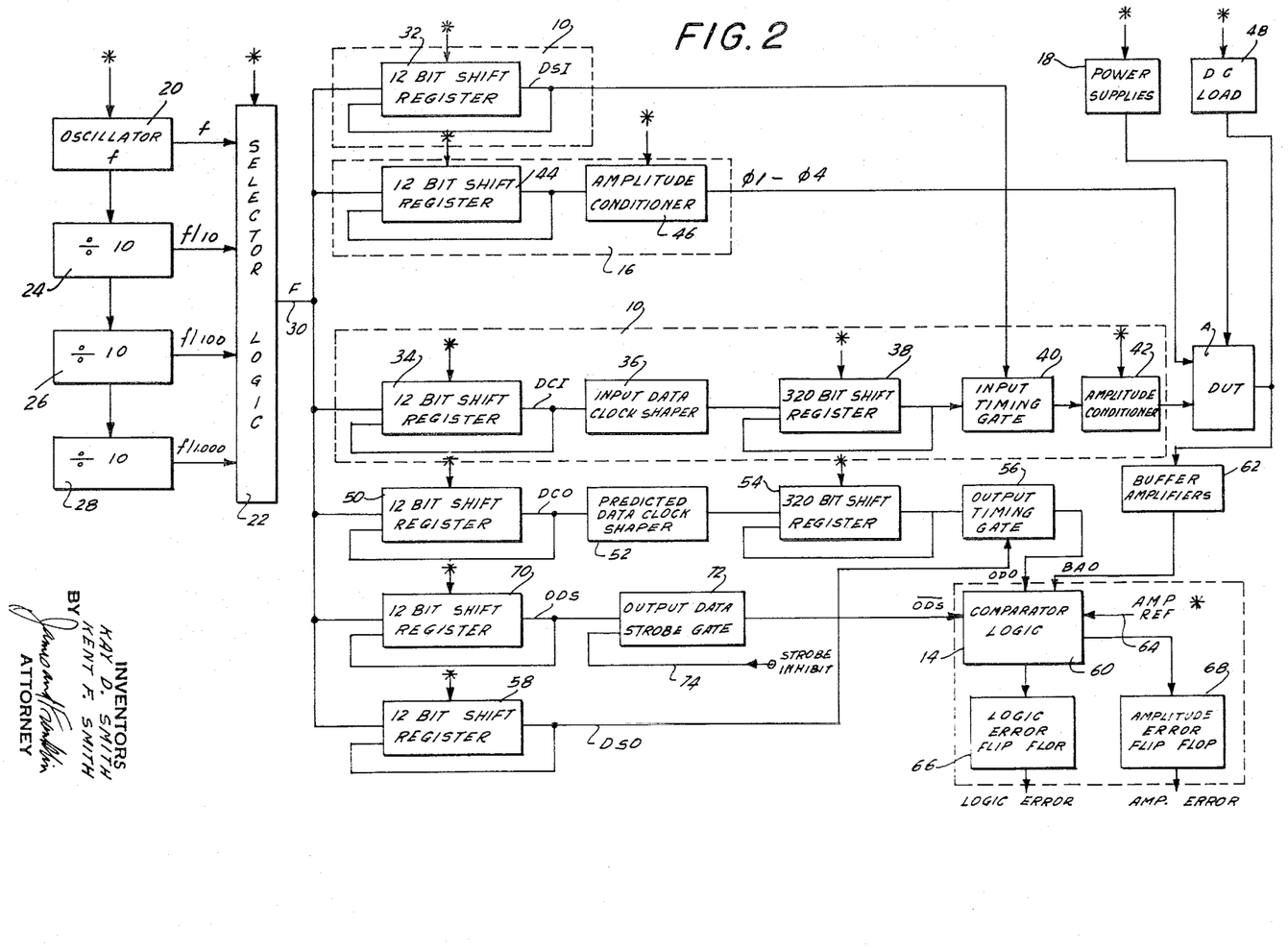
FIG. 2 is a more detailed functional block diagram of the test apparatus of the invention.

The functional test section of the tester of the present invention is shown in FIGS. 1–3, FIG. 4 illustrating typical pulse signals produced in and utilized by the functional test section. In a typical test on an LSI device, a plurality of functional circuits are simultaneously checked by applying a plurality of input words to a corresponding plurality of device data input terminals. In FIG. 2, there is shown a functional test section for testing one functional circuit of the DUT, it being understood that the circuitry for testing the remaining functional circuits may be substantially identical and operate in substantially the same manner.

As shown in FIG. 1, the functional test section comprises circuitry for producing a simulated input signal for the DUT as indicated at 10, and circuitry generally designated 12 for developing a predicted or unexpected output signal corresponding to the signal which the DUT, if functioning correctly, would produce at its output when that simulated input signal is applied to its input. The actual data output signal of the DUT and the predicted output signal are both applied to a data comparator 14 which comprises these signals and produces a test signal indicating the results of the comparison. Circuitry indicated at 16 produces simulated clock signals, here shown as four phase clocks 01–04, and additional circuitry at 18 produces simulated power supply signals for the DUT.

At least some of the circuits 10, 12, 16 and 18 of FIG. 1 are preset prior to the performance of a test by signals derived from an external computer (not shown) which is programmed in a known manner to establish the appropriate conditions. In FIG. 1, as in FIG. 2, all circuits that may be controlled by the external computer are indicated by an asterisk.

Comparator 14 compares the amplitude of the device output signal against the computer preset reference amplitude levels and produces an amplitude error signal if there is a deviation between the two, and compares the actual output signal against the predicted output signal produced by circuitry 12 and produces a logic error signal if there is not one-to-one correspondence between the bits in the actual and predicted output signals. The functional tester is also able to check the signal propagation delay between the input and output of the DUT.

FIG. 2 illustrates, in a more detailed form, the functional test section of FIG. 1. The frequency of the test data and clock signals is determined by a master oscillator or clock 20 having a frequency $f$ preset by the external computer. The output signal of oscillator $f$ is applied to a selector logic matrix 22 as well as to frequency decade dividers 24, 26 and 28, which produce output signals having frequencies which are one-tenth of their input signals. Each output signal of the frequency dividers is applied to logic matrix 22. The operation of matrix 22 is controlled by the external computer to pass only one of the four input signals to its output represented at 30. That output frequency F of the matrix 22 is the basic clock frequency of the functional test section. That clock frequency is simultaneously applied to the inputs of a plurality of recirculating 12-bit shift registers which are all initially (i.e., previous to a test) loaded from the computer to establish a predetermined pattern in the bits of each register. That is, a logic "1" level may be established at a predetermined one or more of the 12 bits of each of these shift registers. These registers are effective to further divide the frequency F by 12 and thus to establish the basic test frequency for the data and clock signals for the DUT.

The input data circuitry 10 comprises 12-bit shift registers 32 and 34. The output signal DCI of register 34 is connected to the input of a data clock shaper 36 which may be in the form of a one-shot multivibrator. The shaper 36 is used to provide a narrow pulse. Where such narrowness is not required the shaper 36 can be omitted. Shaper 36 produces pulses which are in turn applied to an internal clock generator in a recirculating 320-bit input data shift register 38 for shifting that register. The register 38 has been previously loaded from the computer to establish therein a 320-bit word having a predetermined logic pattern. The output of shift register 38 is connected to an input timing gate 40 which also receives an input timing gate strobe signal DSI produced by shift register 32, and samples and shapes the output signal of register 38 at the operative coincidence of both input signals thereto. The output signal of gate 40 is applied to an amplitude conditioner 42, controlled by the external computer, which limits the amplitude of the input signal to a predetermined level. The output of amplitude conditioner 42 is applied to the input data terminal of the DUT and defines the simulated input data signal therefor. The data signal to each DUT input may comprise up to 320 bits of data, which are sequentially applied to the DUT at the frequency of the timing signal derived from shift registers 32 and 34.

The clock signal producing circuitry 16 comprises four 12-bit shift registers only one of which, shift register 44, is shown in FIG. 2. Each of the clock pulse registers produces an output clock signal at a predetermined period every 12 cycles of the input frequency F. The output of register 44 is connected to the input of a computer controlled amplitude conditioner 46 which limits the amplitude level of the clock pulse. The output of conditioner 46 is connected to one of the clock phase terminals of the DUT. A logic "1" signal is stored at different bit locations in the four clock phase signal producing shift registers to establish the desired time and phase relation between the four clock phase signals, two of which, 01 and 03 are shown respectively in lines g and h of FIG. 4. In a typical four phase operation, clock phase 02 begins at the beginning of 01 and ends at the beginning of 03, and clock phase 04 begins at the onset of 03 and ends at the beginning of the next 01 clock phase.

The power supply DC voltages $V_{DD}$ and $V_{GG}$ for the DUT are supplied from circuit 18 which may be independently manually preset or computer programmed prior to the performance of a test. The DC load for the DUT is provided by a load circuit 48 which is preferably computer-controlled.

When the DUT is plugged into the test apparatus, a simulated operation of the device may be performed. A simulated input signal is applied to the DUT data input terminals, simulated four phase clock signals are applied to the DUT clock phase terminals, if required, appropriate power supply voltages are applied to the DUT power terminals, and a DC load is provided at the DUT output terminal. All of the data and clock signals may be controlled by the data from the external computer stored in the input shift registers 32, 34, 38 and 44 prior to the performance of the test. The amplitude of these signals are preset by the amplitude conditioners 42 and 46. For these known operating conditions the DUT should produce, if it is operating according to its desired specifications, an output signal or word corresponding to the simulated input signal and having predetermined logic "0" and logic "1" levels. By comparing the actual output word of the DUT for the known test conditions with a predicted output signal, the functional operational accuracy of the DUT is determined.

That predicted output data signal is produced by circuitry 12 which comprises a 12-bit shift register 50, the output signal DCO which is connected to the input of a data clock shaper 52 which may be in the form of a one-shot multivibrator. The shaper 52, like the shaper 36, is used to provide a narrow pulse; where such narrowness is not required the shaper 52 can be omitted. Shaper 52 produces pulses which are at the same frequency as the pulses produced by shaper 36. The pulses from shaper 52 are in turn applied to an internal clock generator in a recirculating 320-bit output data shift register 54 in which data has been previously loaded from the computer to establish therein a 320-bit word having a predetermined logic pattern. That clock generator is effective to periodically transfer signals from register 54 once during each data cycle. The output signal of register 54 is applied to an output timing gate 56 which receives an output timing gate strobe signal DSO from a 12-bit shift register 58. Upon the operative coincidence of the signals from registers 54 and 58, gate 56 produces a signal which is the predicted output signal for the DUT. That signal is applied to one input of a computer logic section 60 of comparator 14.

The actual output signal from the DUT is connected to a buffer amplifier 62, the output of which is applied to a second input of comparator 14. Also applied to the comparator 14 is a source of preset reference levels for both the logic "1" and logic "0" signal levels as indicated at 64. The predicted output signal is compared logically with the actual output signal from buffer amplifier 62, and its logic "0" and "1" levels are compared against the corresponding reference levels. If there is a logic mismatch between the predicted and output signals, that is, if there is not a one-to-one correspondence at each bit of the output word, a logic error signal is produced by logic error flip-flop 66; and if there is an amplitude error in the actual DUT output signal as compared to the reference signal levels, an amplitude error signal is produced by amplitude error flip-flop 68. If the DUT output signal is accurate in both its logic content and in the amplitude of its signals, neither a logic signal nor an error signal is produced by comparator 14. The logic error and/or amplitude error signals may be used to operate indicating devices, such as lights, thereby to indicate the presence of either a logic or amplitude functional error in the device under test. These signals may also be utilized to terminate the functional test.

To permit the sampling of the actual and predicted output data signals during a predetermined period of each data cycle, a data strobe signal ODS is developed by the operation of a shift register 70. The output signal of register 70 is applied to the input of an output data strobe gate 72, the output of which is connected to the comparator 14. There may be occasions, such as when testing a device for a sequential logic operation, in which it is desired not to sample the output data for a number of data cycles. For this reason a strobe inhibit signal may be developed at 74 and when applied to gate 72 is effective to inhibit or prevent the data strobe signal from being produced at gate 72, and thus prevents the operation of comparator 14 as long as the strobe can have a length of between one and 12 bits and can occur in time at any one or more of the 12 bits during a data cycle, depending on the number and bit locations of the logic "1's" stored in register 70, it is possible to sample the output signal of the DUT at any selected bit of each 12 bit data cycle.

Figure 3:
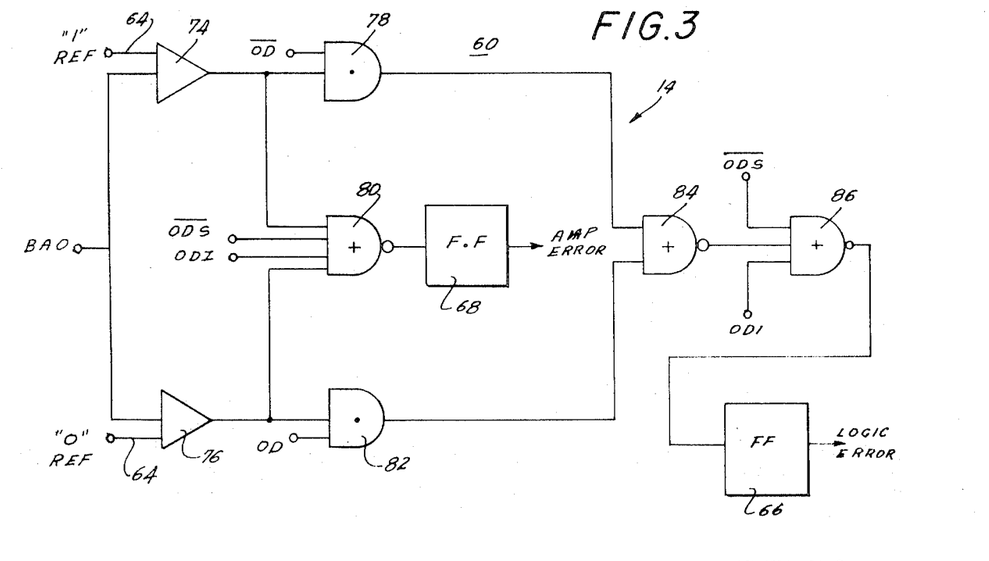
FIG. 3 is a logic diagram of the signal comparator section of the apparatus illustrated in FIG. 2.

FIG. 3 illustrates the comparator circuit 14 which performs the logic and amplitude comparisons on the DUT output data signal and, when either a logic or amplitude error is present, produces an appropriate error signal. The output signal BAO of the buffer amplifier 60 is applied to the inputs of two comparator-differential amplifiers 74 and 76. The other input of amplifier 74 is the logic "1" reference signal and the other input of amplifier 76 is the logic "0" reference signal. The device data "0" signal must be more positive than the reference "0" signal, and the device "1" signal must be more negative than the reference "1" signal, in order for the DUT to be functional. For a nominal level of the device output signal the outputs of each of amplifiers 74 and 76 correspond to the nominal signal, and for an incorrect amplitude level of the DUT output signal as compared to the reference "0" and "1" levels, the output of amplifiers 74 and 76 is at a logic "0" level.

The output of amplifier 74 is applied to one input of an AND-gate 78 and to one input of a NOR-gate 80. The output of amplifier 76 is connected to one input of an AND-gate 82 and to a second input of NOR-gate 80. Also applied to the NOR-gate 80 at its other two inputs are the inverse of the data strobe signal $\overline{ODS}$ and the data inhibit signal ODI. The output of NOR-gate 80 is connected to the amplitude error flip-flop 68.

The other input to AND-gate 78 is the inverse of the predicted output signal $\overline{OD}$ and the other input to AND-gate 82 is the predicted output signal OD. The outputs of AND-gates 78 and 82 are connected to the two inputs of a NOR-gate 84, the output of which is connected to one input of a NOR-gate 86. The other inputs of NOR-gate 86 are the inverse data strobe signals $\overline{ODS}$ and the data inhibit signal ODI. The output of NOR-gate 86 is connected to the logic error flip-flop 66.

For example, if the BAO is correctly at a logic "1" level but of an incorrect magnitude (e.g., less negative than the reference "1" level) the output of amplifier 74 is at a logic "0" level, and if it is at the proper level with respect to the reference "1" level, the output of amplifier 74 is at the nominal level. For a sample or test condition the $\overline{ODS}$ and ODI signals are both at logic "0" levels. For an incorrect "0" or "1" magnitude level, both outputs of amplifiers 74 and 76 are at a logic "0" level. Hence the output of gate 80 is at a logic "1" level. That latter signal is applied to flip-flop 68 and is effective to trigger that flip-flop, thereby to produce the amplitude error signal. If the level of the BAO signal is correct at either the logic "0" or "1" levels, the output of either amplifier 74 or 76 would be at the nominal level, one input to NOR-gate 80 would be at a logic "1" level, one input to NOR-gate 80 would be at a logic "1" level, and its input would thus be at the logic "0" level, which would not trigger flip-flop 68. As a result no amplitude error signal is produced.

A logic comparison is made on the output data signal with respect to the predicted data signal OD and a logic error signal is produced whenever there is a logic mismatch between the two, i.e., when the output data signal at a selected bit is at logic "1" and the predicted data signal is at logic "0" or vice versa. For purpose of explanation it is assumed that the DUT data signal is at a logic "1" level and the predicted output data signal OD is at a logic "0" level indicating a logic error. The output of amplifier 74 is thus a "1" and the output of amplifier 76 is a "0." The $\overline{OD}$ signal is also a "1" so that the output of AND-gate 78 is a "1" and the output of AND-gate 82 is a "0." These signals are applied to the inputs of NOR-gate 84 to produce a "0" signal at the output of that gate which in turn produces a produces a "1" signal at the output of NOR-gate 86. That "1—" signal is effected to trigger flip-flop 66 to produce the logic error signal as directed since the DUT output "1" does not correspond to the predicted "0" signal. For a correct "1" signal the $\overline{OD}$ signal is a "0" and the output of AND-gates 78 and 82 are at a "0" level. The output of NOR-gate 84 is thus a logic "1" which in turn produces a logic "0" at the output of NOR-gate 86. That "0" signal does not trigger flip-flop 66 and no logic error signal is produced as is proper. A similar analysis applied equally for a logically correct and incorrect "0" DUT output signals at which time comparator 14 produces a logic error signal only when the actual output signal is at a "0" signal and the predicted output signal is at "1."

Thus the comparator logic circuit 60, shown schematically in FIG. 3, is effective to compare both the amplitude "0" and "1" output signal levels of the DUT to reference "0" and "1" signals, and also to compare the logic content of the DUT output signal against the predicted output signal. When there is an error either in the amplitude or the logic content of the DUT data output signal a corresponding error signal (logic or amplitude) is produced to indicate the presence and type of error. Since separate error signals are provided for an amplitude and logic error, the source of the functional error can be more readily determined and corrective measures may be made with greater facility.

Figure 4:
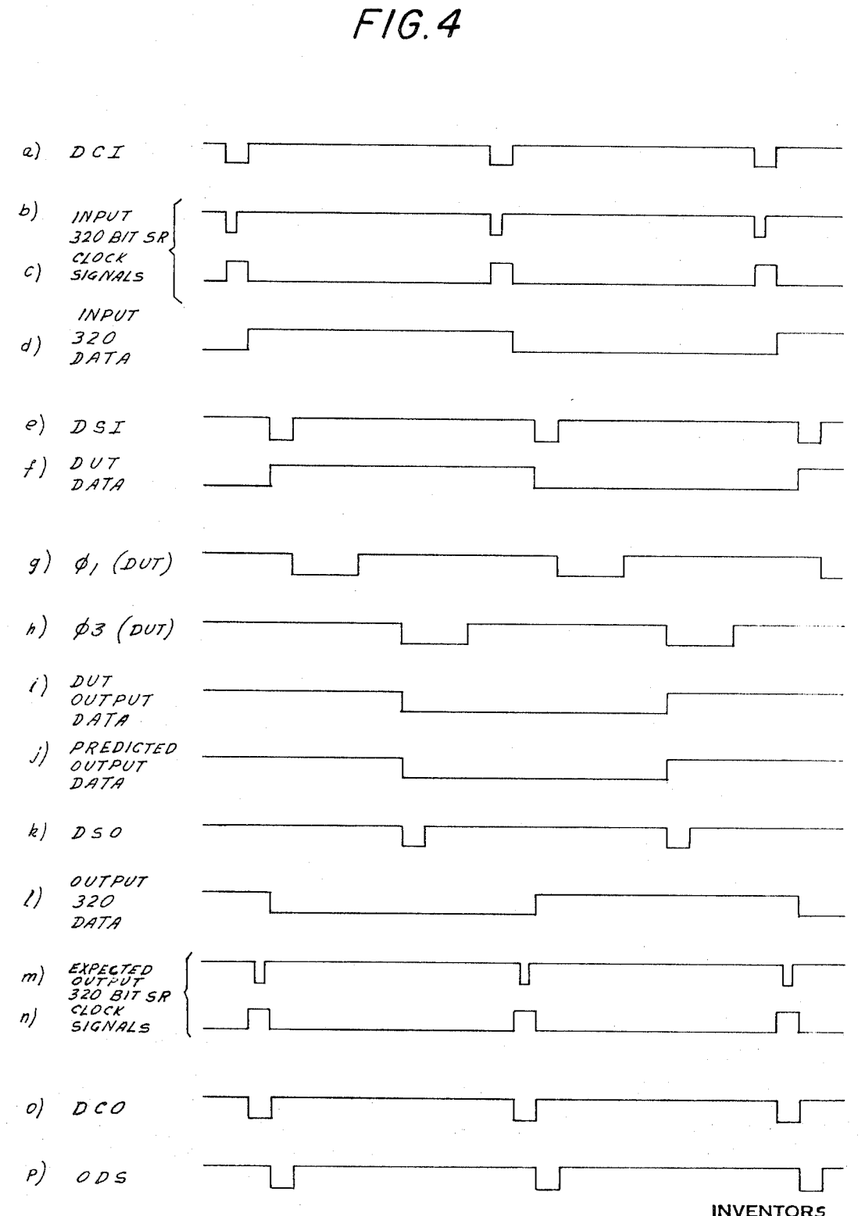
FIG. 4 illustrate typical timing and data signals produced by and utilized during the operation of the functional test section of the test apparatus of the invention.

FIG. 4 illustrates a typical set of pulses which are produced and utilized in the functional test section of FIG. 2 during approximately 2⅓ data cycles of tester operation.

The waveform shown in line $a$ at FIG. 4 represents the output of register 34 or the data clock input DCI signal which is shown as being generated during the second bit of each data cycle, and which in turn produces internal clock signals for the 320-bit shift registers shown in lines $b$ and $c$. These internal clock signals are effective once during each data cycle to shift a data pulse from the 320-bit shift register 38, as shown in line $d$, to one input of timing gate 40. The input timing gate strobe or DSI signal is shown as being produced during the fourth bit of each data cycle by shift register 38. This occurs during the fourth bit of each data cycle. If the input data, signal shown in line $d$, is positive during the fourth bit of each data cycle, as shown in the first data cycle, the output of input timing gate 40, shown in line $f$, is positive until the next sampling period during the next cycle at which time the input data at line $d$ is negative and the DUT input data signal at line $f$ is also negative. The signal at line $f$ is the simulated input signal applied to amplitude conditioner 42 and then to one of the data inputs of the DUT.

The logic function of the DUT is assumed to be an inverter for purposes of illustration and the predicted output data signal corresponding to the input signal at line $f$ for that device is shown at line $j$. That signal is produced by the sampling of the output signal of the 320-bit shift register 54 shown at line 1 by the output timing strobe (DSO) signal, (line $k$) produced by shift register 58. The expected output 320-bit shift register 58 internal clock signals are shown in lines $m$ and $n$ and are effective once during each data cycle to shift a data pulse from the register 54 to one input of timing gate 56. The input timing gate strobe or DSO signal produced at register 50 triggers the sampling of the predicted output data signal from shift register 54. The timing for the DCO signal is determined by the bit location of the "1" signal in register 50 which in turn determines the timing of the data output clock signals during each data cycle.

In the operation shown in FIG. 4, the data output signal (line $i$) is sampled during the fourth bit of each data cycle so that the data strobe signal ODS produced by register 70, (line $p$) is present during the fourth bit of each data cycle as determined by the bit location of the stored "1" signal in register 70. The output data strobe signal thus may be positioned at any one-twelfth of a data cycle and can be fixed by presetting the bit location of the "1" signal in register 70. As stated above in connection with the shift register 38, sampling may be inhibited for any number of data cycles by means of an external strobe inhibit or ODI signal (not shown in FIG. 4) applied to gate 72. The external strobe inhibit signal may be generated by programming one of the 320-bit shift registers 38 and 54 as the inhibit signal which is then connected to the external strobe inhibit line 72.

LEAKAGE AND POWER TESTS

Figure 5:
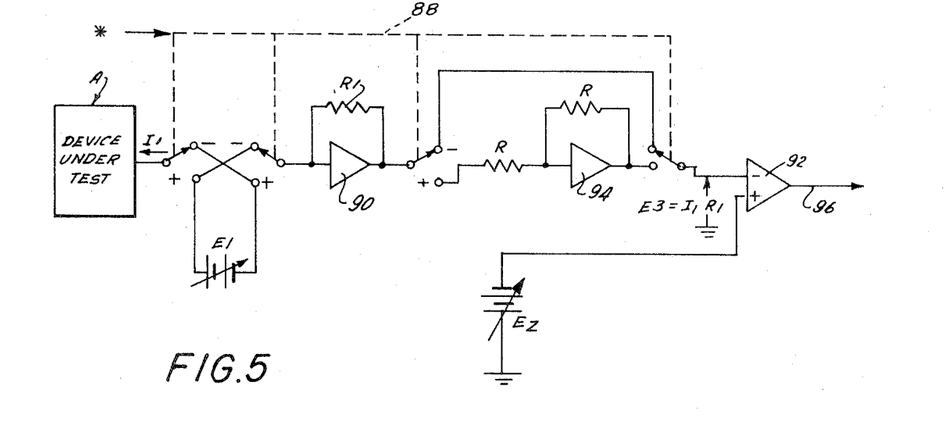
FIG. 5 is a schematic circuit of the leakage measurement section of the test apparatus.

The leakage current of the device under test is tested by the circuit shown in FIG. 5, which produces an output signal when the amount of leakage current exceeds a predetermined level. A test voltage E1, the magnitude of which may be under computer control, is applied to the DUT through preferably a computer controlled switch indicated at 88, which controls the polarity of the applied voltage. A resistor R1 is connected in feedback across an operational amplifier 90, the output of which is connected, when switch 88 is in the position shown in FIG. 5, to one input of a comparator 92. The other input to comparator 92 is a computer controlled reference voltage E2. If switch 88 is positioned in its other position to reverse the polarity of the voltage E1 applied to the DUT, the output of amplifier 90 is connected to the input of a unity-gain inverting amplifier 94, the output of which is then connected to one input of comparator 92.

Any leakage current $I_1$ that flows through the DUT also flows through resistor R1. As a result a voltage E3 approximately equal to $I_1R_1$ is applied to comparator 92, which is compared to the reference voltage E2. If the leakage voltage E3 exceeds the reference voltage, a leakage error signal is produced at the output of comparator 92 at line 96. The levels of voltages E1 and E2 are preset in accord with the nominal known characteristics of the DUT. If desired an actual measurement of the leakage current may be made by programming the computer to calculate the leakage problem by successive approximations in a known manner similar to that employed in an analog to digital converter.

Figures 6, 7:
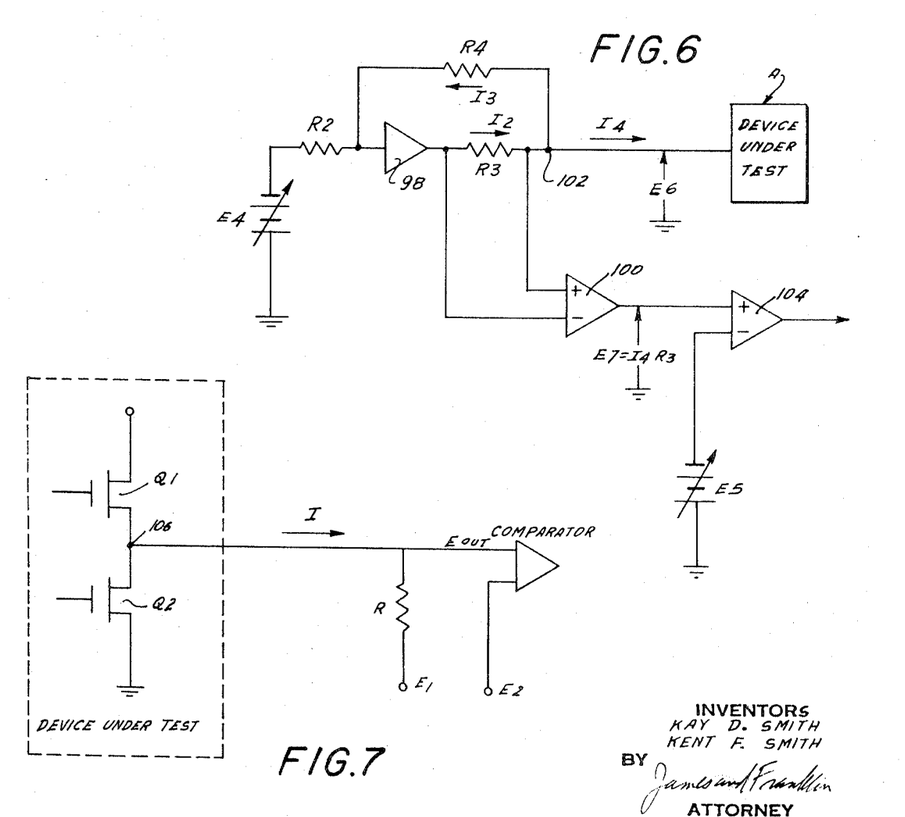
FIG. 6 is a schematic diagram of the power measurement section of the test apparatus of the invention.
FIG. 7 is a schematic diagram illustrating how a DC load test may be performed on the circuit under test.

The test circuit of FIG. 6 tests the power consumption or current drain from the power supply by the DUT and produces a signal if that current exceeds a predetermined desired level. A computer controlled reference voltage E4 is connected through a resistor R2 to the input of an operational amplifier 98, the output of which is connected to one input of a difference amplifier 100, and through a resistor R3 to a point 102. Point 102 is connected through a feedback resistor R4 to the input to amplifier 98, to the other input of difference amplifier 100, and to the DUT. The output of amplifier 100 is connected to one input of a comparator 104. A computer-controlled reference voltage E5 is connected to the other input of comparator 104.

The power supply voltage E6 applied to the DUT is controlled by the computer-controlled reference voltage E4. The current I4 flowing into the DUT is approximately equal to I2 since I3 is much less than I2. The output voltage E7 of the difference amplifier 100 is thus approximately equal to $I_4 R_3$. That voltage is compared to the computer-controlled reference voltage E5 to produce an error signal if the former exceeds the latter. As in the current leakage test, an actual measurement of current I4 may be made by a series of successive approximations with the appropriate computer program.

In the performance of a functional test on the DUT it is often desired to check the level of the current drain from the computer controlled power supplies 18 (FIGS. 1 and 2). This is accomplished by connecting the $V_{GG}$ and $V_{DD}$ power supply terminals of the DUT to the circuit of FIG. 6, the preset power supply voltages $V_{DD}$ or $V_{GG}$ representing the reference voltage E4.

STRESS, STATIC HOLD, DC LOAD AND ITERATION TESTS

Additional tests may be performed on the DUT in combination with a functional test. A stress test is performed to determine whether the gate regions of the field-effect transistors (FETs) formed in the LSI device are capable of withstanding elevated levels of the data, clock and power supply signals. In this test, which is usually performed prior to a functional test on the DUT, the amplitude of the DUT signals begin at their normal amplitudes and are then raised in discrete steps to a peak level. The number of steps and the peak level of the input signals are both under computer control and are preset by the computer test program. Once the stress test is completed, a functional test is performed on the DUT. If the results of the functional test indicate that either logic or amplitude are in error, the DUT is then known to have satisfactorily met its stress requirements as well.

Another operating parameter of an LSI device which may be tested by the tester of the present invention is the ability of the FETs to retain a signal charge at their gate terminals for a given period (e.g., 0.5 second) during which time the device clock phase signals are stopped or held at the proper level. In this test, a specified number of data bits is applied to the input of the DUT as in a regular functional test to preload the FET gates of the DUT. At the completion of the preloading the clock phase signals are stopped and held in that stopped condition for a predetermined period, after which period they are restarted. The previously stored data then appears at the output of the DUT where it is checked for validity by being compared by a predicted output word substantially in the manner described above. The holding time of the clock phase signals and the other test parameters are, as before, under control of the computer program.

An iteration test is performed on the DUT to determine whether the device operates satisfactorily during a functional test when the input data, clock and power supply signals are varied between their upper and lower permissible levels according to the operating specifications of the DUT. In a typical iteration test in which data is supplied to 12 data inputs of the DUT and compared at 12 outputs, there are eight parameters than can be changed; the two power supplies $V_{DD}$ and $V_{GG}$, the "0" and "1" levels of the four phase clock signals, the "0" and "1" levels of the four phase clock signals, the "0" and "1" levels of the data inputs 1–6, and the "0" and "1" levels of inputs 7–12. The 256 possible amplitude combinations of all variable parameters of the device inputs are performed under the control of the computer program and are each applied to the DUT. The data outputs of the DUT are checked for validity, in the manner described above, for all input amplitude combinations. For proper operation of the DUT it will operate according to its specifications for each combination of the input signal levels.

FIG. 7 illustrates the performance of a DC load test which may be performed during a functional test on the DUT on one output stage of the DUT, that output stage consisting of FETs Q1 and Q2 having their output circuits in series connection, an output point 106 being defined at the junction of the output circuits of FETs Q1 and Q2. A resistor R is connected to point 106 and may be conveniently a 5K ohm resistor. A voltage E, programmable from the external computer, is applied to one end of resistor R. E, and R together constitute a simulated load on the DUT. The output signal $E_{out}$ from the DUT is compared to a predetermined reference level from the computer (E2). An error signal is produced if $E_{out}$ does not exceed E2. This test determines whether the DUT is capable of supplying a sufficient load current during a functional operation on an input data signal. In a typical test, the value of E, may be programmable from +10 volts to −40 volts in half-volt steps to enable load current testing of the DUT in 0.1 ma. steps.

SUMMARY

The test apparatus of the present invention is admirably suited for performing tests on LSI and similar devices, as it is able to perform a wide variety of functional and other tests on a great number of such devices having different logical and operational parameters.

The tester makes use of the great flexibility of computer programming to enable its use with many types of DUT's, but, since the computer is removed from the tester during the performance of a test, the frequency at which signals are supplied to the DUT is not limited by the maximum computer frequency. As a result signals in the range of 1–2 MHz. can be provided to the DUT for purposes of testing that device.

In a typical tester the basic clock frequency of the external oscillator is variable between 0 to 12 MHz. For a 12-bit pattern in the control shift registers, 1 MHz. operation is available. However, if a 6-bit pattern can be utilized in the 12-bit shift registers then 2 MHz. operation can be obtained from the data and clock signals to the DUT.

For most commercial LSI devices the 320-bit words provided by the input and output data shift registers are sufficient to perform all the necessary tests on the DUT. If desired, or necessary, that word length may be increased by correspondingly increasing the bit length of these shift registers, or by reloading the registers during the performance of a test.

The tester of the present invention has the capabilities of reliably checking each of the significant operating parameters of an LSI device including functional, leakage and power drain parameters. It does this by the use of a relatively compact device in which the circuitry utilized therein may itself be formed with LSI circuits.

As the computer is not required for use during this performance of a test, it may be used or reprogrammed at the time a test is in progress, so that efficiency of computer utilization is increased.

It will be understood that a given piece of equipment need not be capable of performing all of the tests here enumerated, and that it may be designed to perform other tests, to record output data, and to actuate various types of auxiliary equipment in accordance with sensed test results. Further, some input parameters may be omitted, provided as constant inputs, or provided as manually settable inputs, instead of being computer-programmed as here specifically disclosed.

While only a single embodiment of the present invention has been herein specifically disclosed, it will be apparent that many variations can be made thereto without departing from the spirit and scope of the invention.

We claim:

1. A test apparatus for checking the operation of a logic device having an input and output and having the capability of logically processing a signal applied at its input to produce a signal at its output which is a predetermined logic function of the input signal, said apparatus comprising means adapted to be operatively connected to said device input and effective to produce a predetermined simulated input signal, means effective to produce a predicted output signal corresponding to the output signal which the device would correctly produce at its output when said simulated input signal is applied to its input, and means operatively connected to said predicted output signal producing means, adapted to be operatively connected to said device output and effective to compare said predicted output signal with the actual output signal of the device and to produce an error signal in the event that the output signal from the device differs from said predicted output signal, said simulated input signal producing means comprising first data storage means adapted to have said simulated signal stored therein in a predetermined pattern, defining an input word comprising a plurality of discrete portions, means operatively connected to said data storage means and effective to produce a series of timed control signals, and means effective to operatively apply said control signals to said storage means and to sequentially transfer said discrete portions of said input word from said storage means to the input of said device, in which said predicted output signal producing means comprises second data storage means adapted to have said predicted output signal stored therein in a predetermined pattern defining an output word comprising a plurality of discrete portions, second means operatively connected to said second storage means and effective to produce a series of timed control signals, and means effective to operatively apply said control signals to said second data storage means and to sequentially transfer said discrete portions of said predicted output word from said second data storage means to said output signal comparing means and in which said simulated input signal producing means and in which said simulated input signal producing means comprises a third means effective to produce a series of timed control signals, and gating means having an input and an output, said input being operatively connected to said first mentioned data storage means and said third signal and producing means, said gating means being effective to produce at said output an output signal upon the operative time coincidence of said third timed signals and an output signal from said first data storage means.

2. A test apparatus for checking the operation of a logic device having an input and output and having the capability of logically processing a signal applied at its input to produce a signal at its output which is a predetermined logic function of the input signal, said apparatus comprising means adapted to be operatively connected to said device input and effective to produce a predetermined simulated input signal, means effective to produce a predicted output signal corresponding to the output signal which the device would correctly produce at its output when said simulated input signal is applied to its input, and means operatively connected to said predicted output signal producing means, adapted to be operatively connected to said device output and effective to compare said predicted output signal with the actual output signal of the device and to produce an error signal in the event that the output signal from the device differs from said predicted output signal, said simulated input signal producing means comprising first data storage means adapted to have said simulated signal stored therein in a predetermined pattern, defining an input word comprising a plurality of discrete portions, means operatively connected to said data storage means and effective to produce a series of timed control signals, and means effective to operatively apply said control signals to said storage means and to sequentially transfer said discrete portions of said input word from said storage means to the input of said device, in which said simulated input signal producing means comprises a third means effective to produce a series of timed control signals, and gating means having an input and an output, said input being operatively connected to said first mentioned data storage means and said third signal producing means, said gating means being effective to produce at said output an output signal upon the operative time coincidence of said third timed signals and an output signal from said first data storage means.

3. The test apparatus of claim 2, further comprising limiting means operatively connected to the output of said gating means and effective to limit the amplitude of the gating means output signal to a predetermined level.

4. The test apparatus of claim 3, further comprising fourth means effective to produce a series of timed control signals, and second gating means operatively connected to the output of said second data storage means and to said fourth signal producing means and effective upon the operative coincidence of said fourth timed signals and an output signal from said second data storage means to produce a signal at its output, said second gating means output signal defining said predicted output signal.

5. The test apparatus of claim 4, further comprising means synchronously operatively connected to said first timed control signal producing means and effective to produce a second series of timed control signals, second limiting means operatively connected to said second timed control signal producing means and effective to limit the amplitude of said second timed control signals to a predetermined level, and means operatively connected to said second limiting means and effective to apply said second timed control signals to said device.

6. The test apparatus of claim 5, in which said timed control signals comprise first and second clock signals having the same predetermined frequency and having a predetermined phase relation with respect to one another, said means for producing said control signals comprising first and second shift registers respectively having data stored therein in a predetermined pattern corresponding to the desired phase relation between said first and second clock signals, and means effective to simultaneously apply input timed signals to said first and second shift registers at the same frequency, thereby to produce said first and second clock signals at said first and second shift registers respectively.

7. The test apparatus of claim 6, in which said device output signal is to be at one of two discrete logic levels, said comparing means comprising first and second sources of reference signals corresponding to said first and second discrete levels, and means effective to compare the relative amplitudes of said output signal levels and said reference levels and to produce an amplitude error signal in the event that the amplitude of said device output signal differs from either of said reference signals.

8. The test apparatus of claim 7, in which said comparing means further comprises logic means receiving said predicted output signal and said device output signal, and effective to logically compare these signals and to produce a logic error signal when there is a logical difference between said device output signal and said predicted output signal.

9. The test apparatus of claim 8, further comprising a source of timed scanning means operative during a predetermined increment during each cycle and effective to sample and test said device output signal only during said cycle increment.

10. The test apparatus of claim 9, further comprising controllable inhibit means effective when actuated to disable said source of timed scanning signals for a predetermined number of cycles.

11. A test apparatus for checking the operation of a logic device having an input and output and having the capability of logically processing a signal applied at its input to produce a signal at its output which is a predetermined logic function of the input signal, said apparatus comprising means adapted to be operatively connected to said device input and effective to produce a predetermined simulated input signal, means effective to produce a predicted output signal corresponding to the output signal which the device would correctly produce at its output when said simulated input signal is applied to its input, and means operatively connected to said predicted output signal producing means, adapted to be operatively connected to said device output and effective to compare said predicted output signal with the actual output signal of the device and to produce an error signal in the event that the output signal from the device differs from said predicted output signal, said simulated input signal producing means comprising first data storage means adapted to have said simulated signal stored therein in a predetermined pattern, defining an input word comprising a plurality of discrete portions, means operatively connected to said data storage means and effective to produce a series of timed control signals, and means effective to operatively apply said control signals to said storage means and to sequentially transfer said discrete portions of said input word from said storage means to the input of said device, further comprising means synchronously operatively connected to said first timed control signal producing means and effective to produce a second series of timed control signals, limiting means operatively connected to said second timed control signal producing means and effective to limit the amplitude of said second timed control means to a predetermined level, and means operatively connected to said limiting means and effective to apply said second timed control signals to said device.

12. The test apparatus of claim 11, in which said timed control signals comprise first and second clock signals having the same predetermined frequency and having a predetermined phase relation with respect to one another, said means for producing said control signals comprising first and second shift registers respectively having data stored therein in a predetermined pattern corresponding to the desired phase relation between said first and second clock signals, and means effective to simultaneously apply input timed signals to said first and second shift registers at said predetermined frequency, thereby to produce said first and second clock signals at said first and second shift registers respectively.

13. A test apparatus for checking the operation of a logic device having an input and output and having the capability of logically processing a signal applied at its input to produce a signal at its output which is a predetermined logic function of the input signal, said apparatus comprising means adapted to be operatively connected to said device input and effective to produce a predetermined simulated input signal, means effective to produce a predicted output signal corresponding to the output signal which the device would correctly produce at its output when said simulated input signal is applied to its input, and means operatively connected to said predicted output signal producing means, adapted to be operatively connected to said device output and effective to compare said predicted output signal with the actual output signal of the device and to produce an error signal in the event that the output signal from the device differs from said predicted output signal, said simulated input signal producing means comprising first data storage means adapted to have said simulated signal stored therein in a predetermined pattern, defining an input word comprising a plurality of discrete portions, means operatively connected to said data storage means and effective to produce a series of timed control signals, and means effective to operatively apply said control signals to said storage means and to sequentially transfer said discrete portions of said input word from said storage means to the input of said device, in which said device output signal is to be at one of two discrete logic levels, said comparing means comprising first and second sources of reference signals corresponding to said first and second discrete levels, and means effective to compare the relative amplitudes of said device output signal levels and said reference levels and to produce an amplitude error signal in the event that the amplitude of said device output signal differs from either of said reference signals, in which said comparing means further comprises logic means receiving said predicted output signal and said device output signal, and effective to logically compare these signals and to produce a logic error signal when there is a logical difference between said device output signal and said predicted output signal, and further comprising a source of timed scanning signals operative during a predetermined increment during each cycle and effective to sample and test said device output signal only during said cycle increment.

14. The test apparatus of claim 13, further comprising controllable inhibit means effective when actuated to disable said source of timed scanning signals for a predetermined number of cycles.

15. A test apparatus for checking the operation of a logic device having an input and output and having the capability of logically processing a signal applied at its input to produce a signal at its output which is a predetermined logic function of the input signal, said apparatus comprising means adapted to be operatively connected to said device input and effective to produce a predetermined simulated input signal, means effective to produce a predicted output signal corresponding to the output signal which the device would correctly produce at its output when said simulated input signal is applied to its input, and means operatively connected to said predicted output signal producing means, adapted to be operatively connected to said device output and effective to compare said predicted output signal with the actual output signal of the device and to produce an error signal in the event that the output signal from the device differs from said predicted output signal, said simulated input signal producing means comprising first data storage means adapted to have said simulated signal stored therein in a predetermined pattern, defining an input word comprising a plurality of discrete portions, means operatively connected to said data storage means and effective to produce a series of timed control signals, and means effective to operatively apply said control signals to said storage means and to sequentially transfer said discrete portions of said input word from said storage means to the input of said device, further comprising a source of timed scanning signals operative during a predetermined increment during each cycle and effective to sample and test said device output signal only during said cycle increment.

16. The test apparatus of claim 15, further comprising controllable inhibit means effective when actuated to disable said source of timed scanning signals for a predetermined number of cycles.

17. A test apparatus for checking the operation of a logic device having an input and output and having the capability of logically processing a signal applied at its input to produce a signal at its output which is a predetermined logic function of the input signal, said apparatus comprising means adapted to be operatively connected to said device input and effective to produce a predetermined simulated input signal, means effective to produce a predicted output signal corresponding to the output signal which the device would correctly produce at its output when said simulated input signal is applied to its input, and means operatively connected to said predicted output signal producing means, adapted to be operatively connected to said device output and effective to compare said predicted output signal with the actual output signal of the device and to produce an error signal in the event that the output signal from the device differs from said predicted output signal, said simulated input signal producing means comprising first data storage means adapted to have said simulated signal stored therein in a predetermined pattern, defining an input word comprising a plurality of discrete portions, means operatively connected to said data storage means and effective to produce a series of timed control signals, and means effective to operatively apply said control signals to said storage means and to sequentially transfer said discrete portions of said input word from said storage means to the input of said device, in which said first data storage means comprises a first shift register having a predetermined pattern stored therein and receiving said timed control signals, said first shift register being effective during a predetermined portion of each cycle as determined by said predetermined pattern to produce a first signal, a second shift register having an internal clock pulse generating circuit and having said input word stored therein, and means for operatively applying said first signal to said internal clock pulse generating circuit in said second shift register, thereby to trigger the latter to produce a shift therein.

18. The apparatus of claim 17 in which said predicted output signal producing means comprises second data storage means adapted to have said predicted output signal stored therein in a predetermined pattern defining an output word comprising a plurality of discrete portions, second means operatively connected to said second storage means and effective to produce a series of timed control signals, and means effective to operatively apply said control signals to said second data storage means and to sequentially transfer said discrete portions of said predicted output word from said second data storage means to said output signal comparing means.

19. The test apparatus of claim 17, in which said simulated input signal producing means comprises a third means effective to produce a series of timed control signals, and gating means having an input and an output, said input being operatively connected to said first mentioned data storage means and said third signal producing means, said gating means being effective to produce at said output an output signal upon the operative time coincidence of said third timed signals and an output signal from said first data storage means.

* * * * *